United States Patent [19]

Wakabayashi et al.

[11] 4,121,452
[45] Oct. 24, 1978

[54] INSPECTION AND EXAMINATION APPARATUS FOR MOTOR CARS

[75] Inventors: Takeshi Wakabayashi; Hiroshi Umetsu, both of Nagoya, Japan

[73] Assignee: Mitsubishi Jukogyo, Tokyo, Japan

[21] Appl. No.: 760,770

[22] Filed: Jan. 10, 1977

Related U.S. Application Data

[63] Continuation-in-part of Ser. No. 674,311, Apr. 7, 1976, abandoned.

[30] Foreign Application Priority Data

May 7, 1975 [JP] Japan .................................. 50-55197

[51] Int. Cl.² .............................................. G01M 17/00
[52] U.S. Cl. ....................................... 73/117.3; 73/117
[58] Field of Search ....................... 73/116, 117.3, 117

[56] References Cited

U.S. PATENT DOCUMENTS

| 3,889,273 | 6/1975 | Deiss et al. ......................... 73/117 X |
| 3,919,466 | 11/1975 | Huwyler et al. ................... 73/116 X |
| 3,935,427 | 1/1976 | Geul .................................... 73/116 X |

*Primary Examiner*—Jerry W. Myracle

[57] ABSTRACT

An improved inspection and examination apparatus for motor cars has car variety number receiver means for receiving a car variety number that is determined depending upon the type and various characteristics of a motor car, an inspection type selector means for selecting the type of inspection and adjustment desired, an inspection item memory circuit for storing inspection items required for each type of inspection and adjustment with respect to every motor car, a reference value memory circuit for storing predetermined reference values for said inspection items, an inspection item selector circuit for successively selecting the inspection items corresponding to the car variety number and the inspection type from said inspection item memory circuit, display means for displaying the inspection item selected by the inspection item selector circuit, and a good/bad decision circuit adapted to select reference values corresponding to the inspection items selected by the inspection item selector circuit from the reference value memory circuit and to decide whether the result of the inspection is good or bad by comparing the selected reference values with the respective measured values.

3 Claims, 15 Drawing Figures

| SLIDE SLIP | 2 | (S) | SLOWLY ADVANCE | |
|---|---|---|---|---|
| | ↑ | | STOP FRONT WHEELS ON ROLLERS | (S) |

FIG.10

| SPEED METER | 13 | FIXED AT 40 $K_m/_H$ BY TOP GEAR | | |
|---|---|---|---|---|
| | ↓ | | (S) | ⌇ |

FIG.11

| ITEM NUMBERS | 12 MOS. | 6 MOS. | NEW CAR | E | B | A | |
|---|---|---|---|---|---|---|---|
| ⌇ | | | ⌇ | | | | |
| 2 | 1 | 1 | 1 | 0 | 0 | 1 | |
| ⌇ | | | ⌇ | | | | |
| 13 | 1 | 1 | 1 | 1 | 0 | 0 | |
| ⌇ | | | ⌇ | | | | |

FIG.12

| ADDRESS | DATA | INT. OF DATA | REMARKS |
|---|---|---|---|
| STDSSP | 030030 | +3m/m | SIDE SLIP UPPER LIMIT REF. VALUE |
| STDSSN | 130030 | −3m/m | SIDE SLIP LOWER LIMIT REF. VALUE |
| STDSMH | 030444 | 44.4Km/H | SPEED METER UPPER LIMIT REF. VAL. |
| STDSML | 030348 | 34.8Km/H | SPEED METER LOWER LIMIT REF. VAL. |
| ⌇ | ⌇ | ⌇ | ⌇ |

INSPECTION AND EXAMINATION APPARATUS FOR MOTOR CARS

This is a continuation-in-part application of Ser. No. 674,311, filed Apr. 7, 1976, now abandoned.

The present invention relates to improvements in an apparatus to be used for inspection and examination of motor cars.

In order to secure safety of motor cars and to prevent environmental harm caused by exhaust gas of motor cars, periodic inspections and adjustments every month, every 6 months, every 12 months, etc. as well as inspections and adjustments at every predetermined total running distance, are required for motor cars in use, and the carrying out of a number of kinds of inspections and adjustments have been required by laws and ordinances. For the inspection and adjustment obligated by laws and ordinances, there are more than 200 items which must be inspected and examined, and so it is very difficult to perform the inspection and examination with respect to these items in good order without any omissions. Also, upon comparing the result of the inspection and examination with a reference value to decide whether the result is good or bad, a large number of operations and a great deal of labor are required because the reference values are different depending upon the varieties and types of motor cars.

Therefore, it has been proposed to automatically display items for inspection and examination by a display panel. However, all of the items can not be displayed, because the items for inspection and examination are different depending upon the kinds of inspection and adjustment as well as the types and various factors of the motor cars, and because the number of the inspection items exceeds 200. Especially, there remains a problem that if a new motor car having a peculiar structure should appear in the market, the display of inspection items for such motor car would become impossible.

Still further, for the purpose of a good/bad decision for the results of inspection and examination, values serving as a reference for the inspection and examination are necessary. But these values are different depending upon the variety of the motor car and depending upon the kind of the inspection and examination, so that the work of arranging and extracting these values becomes very troublesome, and not only is it time-consuming but also is apt to produce errors. In connection with the aforementioned problems, although it might be possible to store all the reference values whether minor or major in a computer for each variety of all the cars in use and thereby make it possible for the reference values to be automatically processed, if all the reference values for every variety of car are collected as basic data, the amount of data would become enormous, and since the data for indicating the inspection items to the inspector in the order of operations for every variety of car would have to be added to the above-mentioned basic data, naturally a problem would arise with respect to the memory capacity of the computer. In addition, there is a problem that if a new variety of motor car appears, the inspection and examination with respect to the new variety of motor car cannot be performed unless the data relating to the new variety of motor car has first been stored in the computer.

The present invention has been proposed in order to eliminate the shortcomings in the heretofore known apparatuses as described above, and it is one object of the present invention to provide an improved inspection and examination apparatus for motor cars that can perform inspection and examination of motor cars exactly, easily and quickly.

Another object of the present invention is to provide an improved inspection and examination apparatus for motor cars that is applicable to every kind of inspection and adjustment, and that is in itself small-sized and inexpensive.

Still another object of the present invention is to provide an improved inspection and examination apparatus for motor cars, which can automatically display or indicate to an inspector the necessary items for inspection and examination in proper order without any omissions, and also which can automatically determine whether the results of the inspection and examination are good or bad with respect to predetermined reference values.

Above-described and other features and objects of this invention will become more apparent by reference to the following description taken in conjunction with the accompanying drawings, in which:

Figure 1:
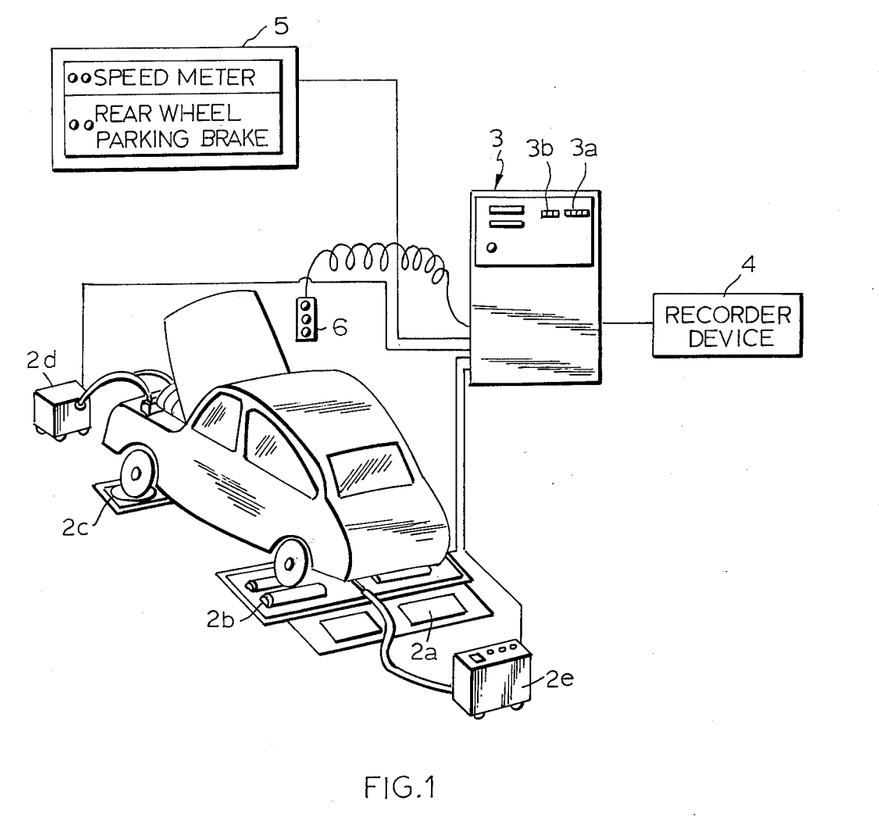
FIG. 1 is a schematic perspective view showing one preferred embodiment for the inspection and examination apparatus of motor cars according to the present invention.

Now one preferred embodiment of the present invention will be described in more detail with reference to the drawings. In FIG. 1, reference numeral 1 designates a motor car to be inspected, numerals 2a – 2e designate measurement instruments to be used for inspection and examination of the motor car, said measurement instruments consisting of a side slip tester 2a, combination tester 2b, wheel alignment tester 2c, engine analyzer 2d and exhaust gas tester 2e. Reference numeral 3 designates an operation console provided with a computer, numeral 4 designates a recorder device for recording the results of the inspection, numeral 5 designates a display device for displaying inspection items, and numeral 6 designates a manual operation device for manually applying to the input of the apparatus the results of visual inspection or manually inspection, the operation of the display device 5 and the operation of the measurement instruments. It is to be noted that the aforementioned measurement instruments 2a – 2e, recorder device 4, display device 5 and manual operation device 6 are respectively electrically connected to the console 3.

In the measurement instruments, the side slip tester 2a is an instrument for measuring the amount of slip between front wheel tires of the motor car 1 and the ground surface to determine the state of alignment of the front wheels. The combination tester 2b is an instrument for measurement the speed, braking force, accelerating force, etc. of the motor car 1 while simulating its running state, and which consists of rolls and a driving motor therefor for driving the wheels of the motor car 1 and a device for absorbing rotational energy of the rolls. The wheel alignment tester 2c is an instrument for measuring the toe, camber and castor of a front wheel and the maximum steering angle of steering. The engine analyzer 2d is a device for electrically measuring and detecting the condition of an engine by connecting its detecting terminals to predetermined portions of the engine. The exhaust gas tester 2e is an instrument for sampling the exhaust gas of the motor car 1 and measuring the composition and a density of said exhaust gas.

Figure 2:
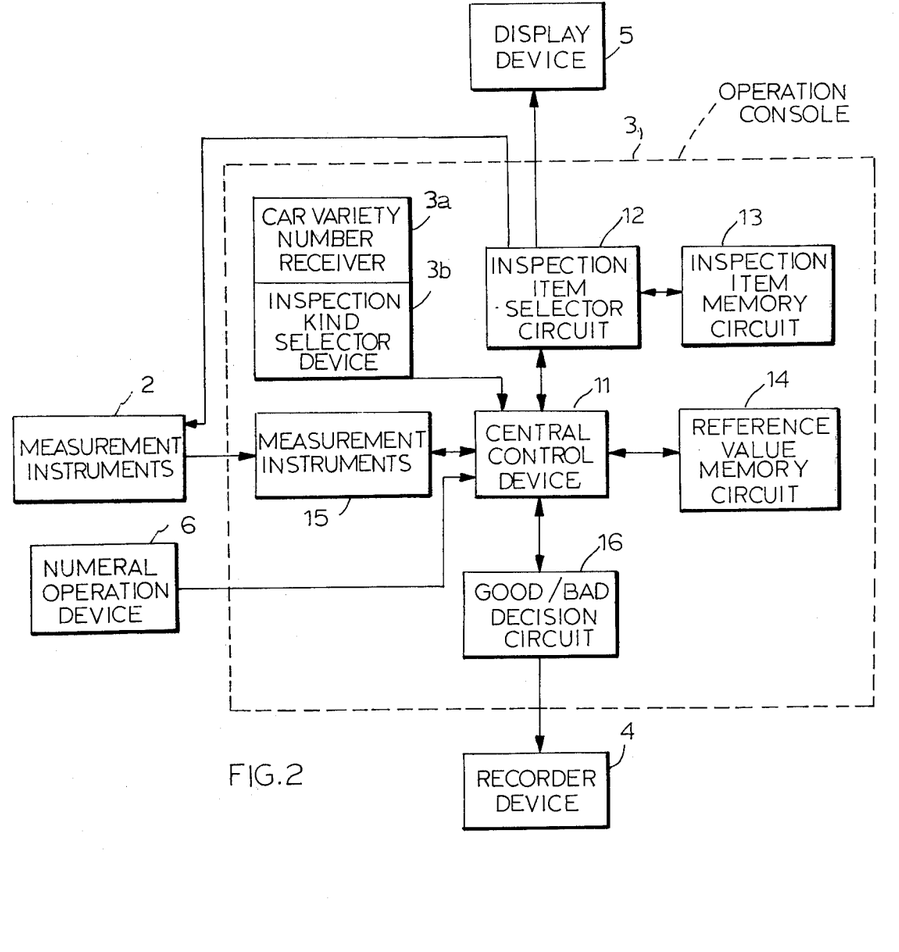
FIG. 2 is a system diagram of the same.

As shown in FIG. 2, the operation console 3 comprises a central control device 11 which, upon receiving an input signal, performs operations and transmits a predetermined command signal, a car variety number receiver device 3a for receiving a car variety number that is according to the type and various characteristics of a motor car, an inspection type selector device 3b for receiving the type of inspection that is to be carried out, an inspection item memory circuit 13 for storing inspection items required for each inspection and adjustment with respect to every motor car to be inspected and examined, a reference value memory circuit 14 for storing predetermined reference values for said inspection items, an inspection item selector circuit 12 responsive to a signal received from said central control device 11 for successively selecting the inspection items corresponding to said car variety number and said type of inspection from said inspection item memory circuit 13 and transmitting signals representing the selected inspection items to the display device 5 and the measurement instruments 2a – 2e, a measurement circuit 15 for converting signals representing measured values obtained by the measurement instruments 2a – 2e and applying the converted signals to the input of the central control device 11, and a good/bad decision circuit 16 for selecting reference values corresponding to the inspection items selected by the inspection item selector circuit 12 from the reference value memory circuit 14, comparing the reference values with said measured values, making a decision of whether the result of the comparison is good or bad for each inspection item, and transmitting the results of the decision to a recorder device 4.

Figure 3:
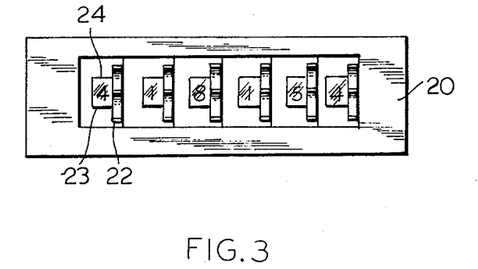
FIG. 3 is a schematic view of a car variety number receiver device.

The above-described car variety number receiver device 3a includes a plurality of rotary switches contained in a housing 20 having windows 24 at its front surface as shown in FIG. 3, and is mounted on the front panel of the operation console 3. In each rotary switch, a sprocket type of disc 22 and a drum-shaped dial plate 23 are fixedly secured on a rotatable shaft. This dial plate 23 has numerals 0 to 9 stamped on its circumference, and said numerals appear at the center of the window 24 and also an input signal corresponding to each said numeral is applied to the input of the central control device 11. Six rotary switches are provided in the illustrated embodiment and are aligned with said window 24.

At first, the method of determining the car variety number to be received by the car variety number receiver device 3a will be explained in connection with an example. Provisionally, items to be used for classifying motor cars in respect to their types and various characteristics are represented by symbols A, B, . . . F, respectively, as indicated in TABLE 1 below. Then the varieties of motor cars having variations of each item A, B, . . . F are represented by code numbers 1, 2, . . . 9, 0 depending upon the types, existence or non-existence of the items, and number of the item or sub-items included in said item as indicated in TABLE 2 below.

| Symbols | Items to be used for classification |
|---|---|
| A | Number of cylinders, number of cycles of the engine and wheels braked by parking brake |
| B | Front-engine front-drive type, automatic transmission type, and necessity of motoring |
| C | Displacement of engine |
| D | Vacuum braking power multiplier device |
| E | Front wheel axle loading (unloaded car weight) |
| F | Rear wheel axle loading (unloaded car weight) |

TABLE 2

| | A | | | B | | | C | D | E, F |
|---|---|---|---|---|---|---|---|---|---|
| Code Number | Number of Cylinders | Number of Cycles of Engine | Wheels to which Parking brake applied | F.F. | A.T. | Necessity of Motoring | Displacement (c.c.) | Existence | Axle loading (Kg) |
| 1 | 2 cylinders | 2 cycles | 2 rear wheels | NO | NO | NO | 360 or less | YES | 50 – 149 |
| 2 | 2 cylinders | 4 cycles | 2 rear wheels | NO | YES | NO | 500 – 849 | — | 150 – 249 |
| 3 | 3 cylinders | 2 cycles | 2 rear wheels | YES | NO | NO | 850 – 1049 | — | 250 – 349 |
| 4 | 4 cylinders | 4 cycles | 2 rear wheels | YES | YES | NO | 1050 – 1249 | — | 350 – 449 |
| 5 | 4 cylinders | 4 cycles | 2 front wheels | NO | NO | YES | 1250 – 1449 | — | 450 – 549 |
| 6 | 6 cylinders | 4 cycles | 2 rear wheels | NO | YES | YES | 1450 – 1649 | — | 550 – 649 |
| 7 | — | — | — | YES | NO | YES | 1650 – 1849 | — | 650 – 749 |
| 8 | 8 cylinders | 4 cycles | 2 rear wheels | YES | YES | YES | 1850 – 2049 | — | 750 – 849 |
| 9 | — | — | — | — | — | — | 2050 – 2649 | — | 850 – 949 |
| 0 | 2 rotary engines | | 2 rear wheels | — | — | — | 2650 or more | NO | — |

NOTE
F.F.: Front-engine Front-drive Type
A.T.: Automatic transmission Type

In Table 2 above, the code numbers 1, 2, . . . 9, 0 are commonly used for the respective items A, B, . . . F. For instance, number 1 for Item A designates a type of car having "2 cylinders, 2 cycle engine and the parking brake on the 2 rear wheels," and number 3 for item B designates the type of car having a "front-engine front-drive, no automatic transmission, motoring being unnecessary." A numeral consisting of these code numbers arranged in the order of A, B, . . . , F, is the "car variety number", and for instance, the type and various characteristics of the motor car represented by the car variety number 639186 are found from TABLE 2 as follows:

6 for item A: 6 cylinders, 4 cycle engine and parking brake applied to 2 rear wheels, 3 for item B: front-engine front drive, no automatic transmission and motoring being unnecessary, 9 for item C: displacement of 2050 – 2649 c.c., 1 for item D: equipped with vacuum braking power multiplier device, 8 for item E: front wheel axle loading of 750 – 849 Kg, and 9 for item F: rear wheel axle loading of 850 – 949 Kg.

The method of determining the car variety numbers is not limited to the above-described example, but it could be widely varied according to the practical requirements.

Figure 4:
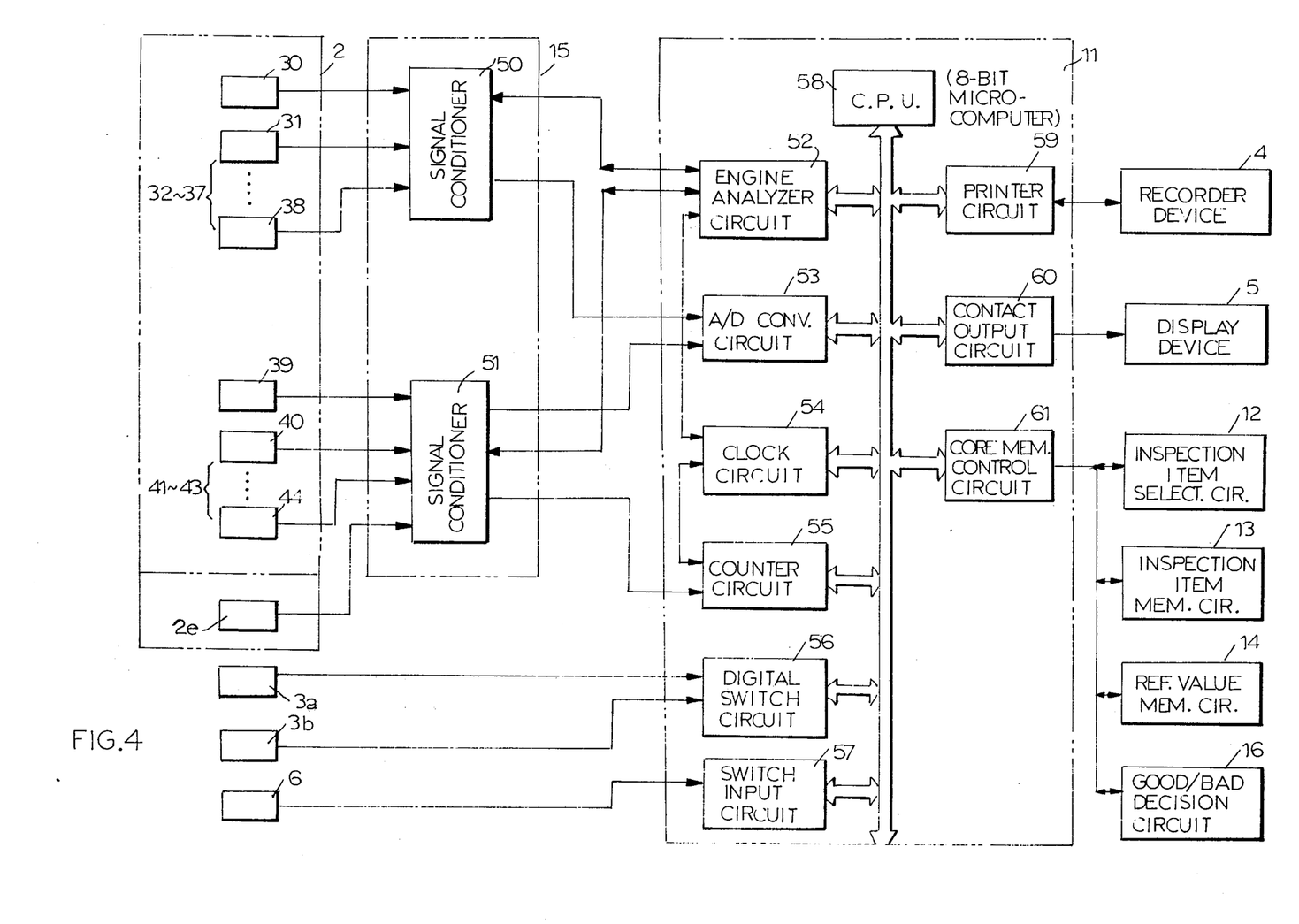
FIG. 4 is a schematic diagram in block form showing details of a central control device.

A car variety number (a six-digit number in the above-described case) of a motor car 1 to be inspected which has been obtained in the above-described manner with reference to TABLE 2, is read out by a digital switch circuit 56 in FIG. 4, and then stored in a reference value memory region 14 by means of a micro-computer 58 and a core memory control circuit 61. On the basis of the car variety number, parameters for calculating the r.p.m. of an engine, a predetermined reference value for an engine output, a reference value for the braking function, etc. can be determined.

The inspection type selector device 3b referred to previously, includes a push-button type of selector circuit for applying to an input of the central control device 11 the signals representing the type of inspection to be performed on the motor car to be inspected, that is, the signals representing the various types of legally required inspections and the types of inspections determined by the total running time or a total distance run such as an inspection after 1000 Km of operation from the beginning of use of the motor car, and the selector circuit is mounted on the front panel of said operation console.

The details of the measurement instruments 2a – 2e, the measurement circuit 15, the inspection type selector device 3b, the manual operating device 6, the display device 5, the central control device 11, the inspection item selector circuit 12, the inspection item memory circuit or memory region 13, the reference value memory circuit or memory region 14 and the good/bad decision circuit 16, will now be explained with reference to FIGS. 4 through 15.

Figure 5:
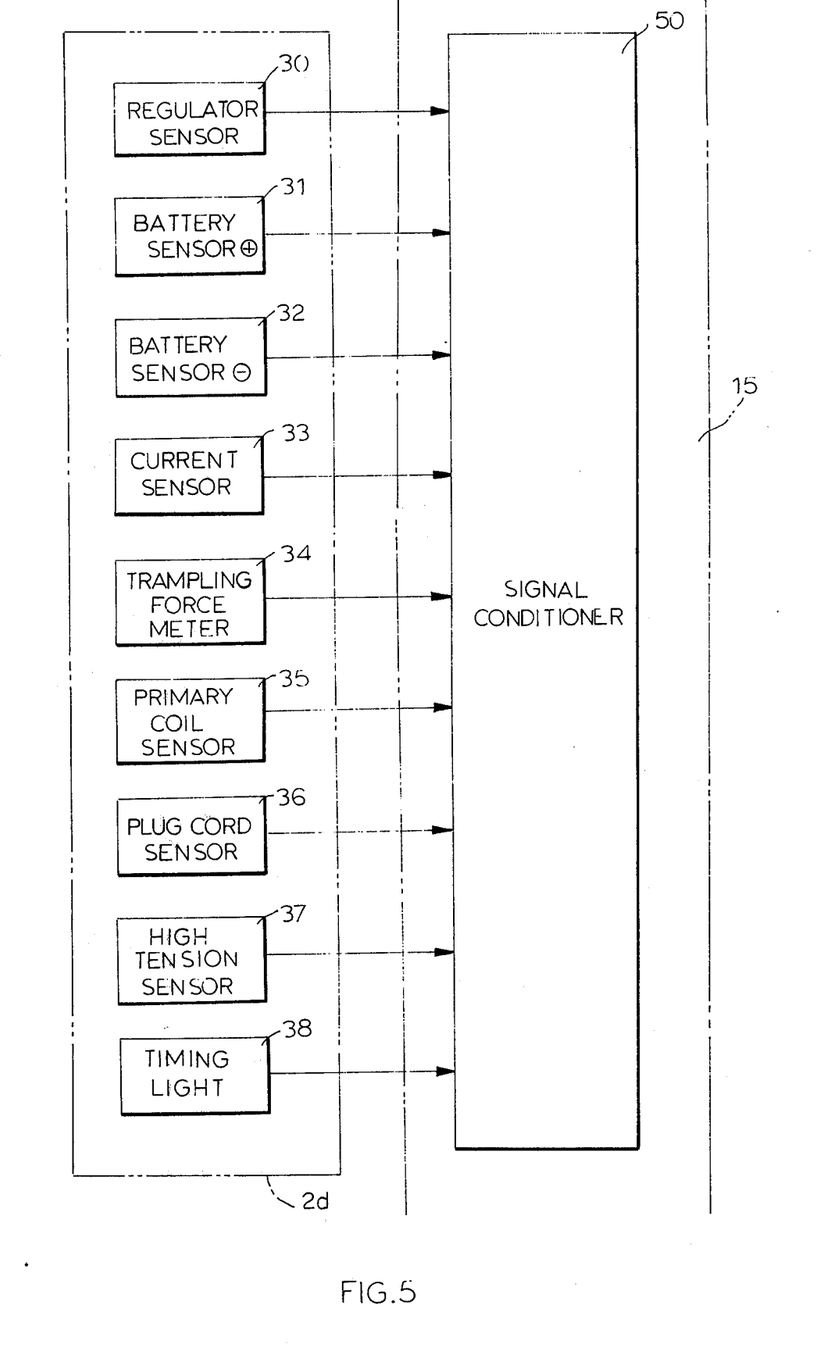
FIGS. 5 and 6 are schematic diagrams in block form showing details of measurement instruments.
Figure 6:
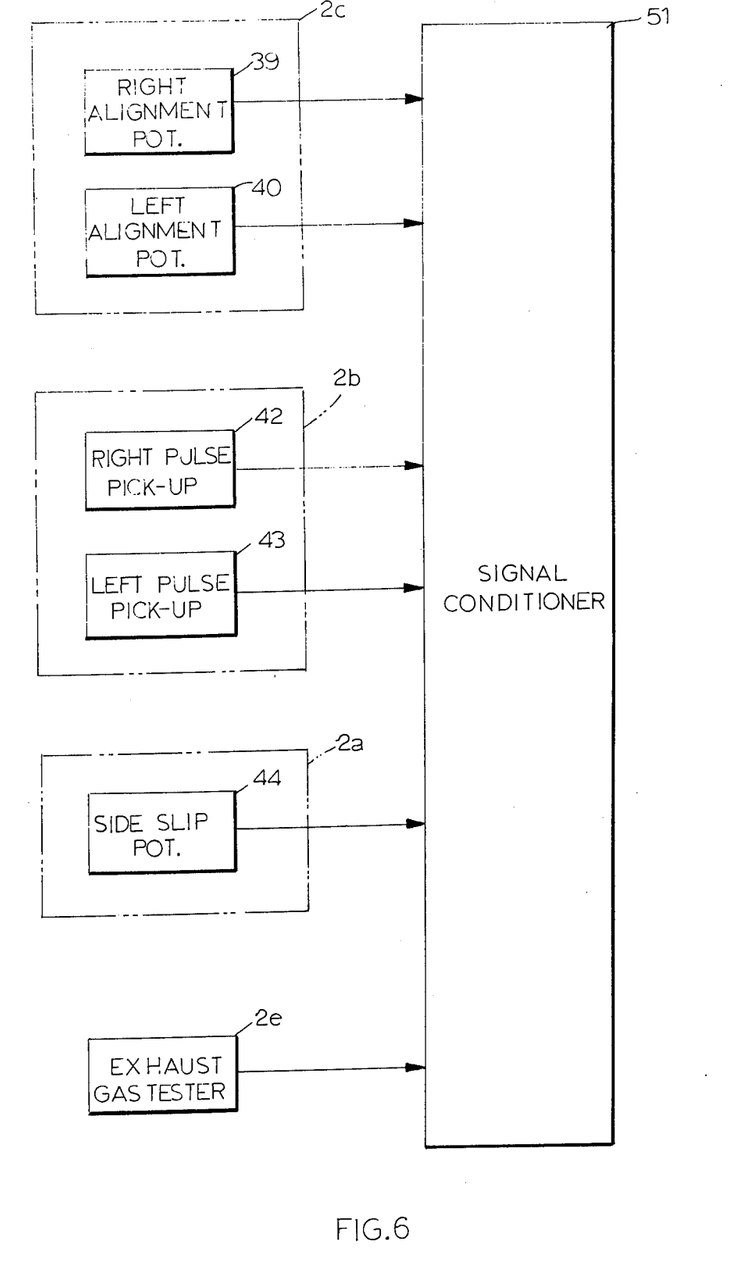

Explaining firstly the details of the measurement instruments 2a– 2e and the measurement circuit 15 with reference to FIGS. 4, 5 and 6, the following signals are derived from respective sensors 30 – 38 of an engine analyzer 2d. That is, from a regulator sensor 30, battery sensor $\oplus$ 31, battery sensor $\ominus$ 32, current sensor 33, primary coil sensor 35, plug cord sensor 36 and high tension sensor 37 are derived signals relating to engine performance for measuring engine performance. In addition, from a trampling force meter 34 mounted on the brake pedal is derived a trampling force signal for braking function measurement. Furthermore, from a timing light 38 is derived a signal relating to ignition timing for ignition timing measurement. These analog signals are once amplified in a signal conditioner 50, and thereafter they are sent to an A/D converter 53 in the central control device 11. It is to be noted that representative analog signals to be processed by the signal conditioner 50 are signals representing battery voltage, starter current, alternator current, etc. In addition, in the signals applied to the signal conditioner 50 are included pulse signals for controlling the measurement circuit 15. These pulse signals comprise a signal for controlling commencement and termination of measurement and a signal for setting and resetting a measured data maximum/minimum value circuit in the signal conditioner 50, and these controls are effected in response to commands from an engine analyzer circuit 52 in the central control device 11. It is to be noted that representative pulse signals processed by the signal conditioner 50 are set and reset signals for an alternator current maximum value circuit in the signal conditioner 50.

Still further, signals are derived from respective sensors 39 – 44 of the side slip tester 2a, combination tester 2b, and wheel alignment tester 2c and from the exhaust gas tester 2e. That is, from the wheel alignment tester 2c are derived output signals of a right alignment potentiometer 39 and a left alignment potentiometer 40, from the combination tester 2b are derived output signals of a right pulse pick-up 42 and a left pulse pick-up 43, from the side slip tester 2a is derived an output signal of a side slip potentiometer 44, and from the exhaust gas tester 2e are derived electric signals for the respective ingredients. The analog signals derived from the respective sensors are once amplified by a signal conditioner 51, and thereafter they are sent to the A/D converter 53 in the central control device 11. It is to be noted that a representative analog signal processed by the signal conditioner 51 is a signal representing the angular displacement of the wheels through a steering angle. In the signals applied to the signal conditioner 51 are included pulse signals for controlling the measurement circuit 15. These pulse signals comprise a signal for controlling commencement and termination of measurement and a signal for setting and resetting a measured data maximum/minimum minimum value circuit in the signal conditioner 51, and these controls are effected in response to commands from the engine analyzer 52 in the central control device 11. It is to be noted that representative pulse signals processed by the signal conditioner 51 are set and reset signals for a side slip maximum/minimum value circuit in the signal conditioner.

Figure 7:
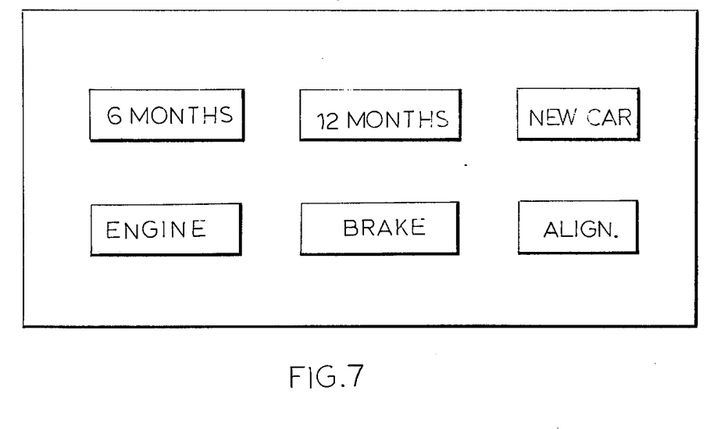
FIG. 7 is a schematic view showing details of an inspection type selector device.

Now details of the above-mentioned inspection type selector device 3b will be described with reference to FIG. 7. When the type of inspection desired is designated by depressing an illuminable push button switch, the information is delivered to the digital switch circuit 56 in the central control device 11. In the labels for the push button switches in FIG. 7, "6 Months" and "12 Months" represent the case of legally required periodic inspections, "New Car" represents the case of a new car inspection, "Engine" represents an inspection only for an engine and its relevant parts, "Brake" represents an inspection only for a brake system and its relevant parts, and "Alignment" represents an inspection only for wheel alignments and relevant parts. When the type of inspection of a motor car 1 to be carried out is applied from the inspection type selector device 3b to the central control device 11, it is read by the digital switch circuit 56, and is stored in an inspection item selector circuit 12 by the micro-computer 58 and the core memory control circuit 61.

Figure 8:
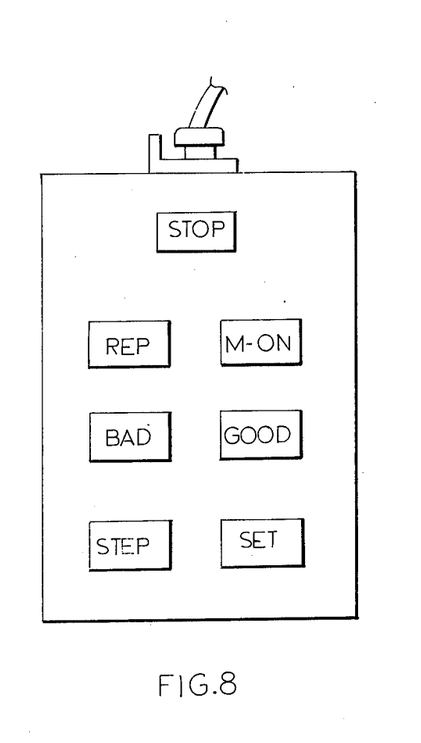
FIG. 8 is a schematic view showing details of a manual operating device.

Next the details of the above-described manual operation device 6 will be described with reference to FIG. 8. This manual operating device 6 comprises push button switches, and the functions of the respective push buttons are as follows:

STOP: Depressed for emergency stop
REP: Meaning "Repeat," and is depressed when repeated measurement is desired.
↑ : Depressed when an intermediate lift of the combination tester 2b is to be raised.
↓ : Depressed when an intermediate lift of the combination tester 2b is to be lowered.
BAD: Depressed upon determination of bad results of visual and manual inspections.
GOOD: Depressed upon determination of good results of visual and manual inspections.
STEP: Depressed when it is desired to step the display device 5 to the next item.
SET: Depressed for starting of a measurement program or upon read-in of data The above information or orders indicated by depression of the corresponding push-button switch is applied to a switch input circuit 57 in the central control device 11.

Explaining now the details of the above-mentioned central control device 11 with reference to FIG. 4, said central control device 11 comprises a micro-computer 58 at the center, and input/output converter circuits 52 – 57 and 59 – 61 connected thereto and depicted on the left side and on the right side, respectively. Among these circuits, the engine analyzer circuit 52 is a circuit for transmitting signals for controlling commencement and termination of measurement and set and reset signals for the measured data maximum/minimun value circuits in the signal conditioners 50 and 51, and the respective control signals are transmitted in response to commands from the micro-computer 58. The A/D converter 53 is a circuit for converting respective analog signals applied to its input into digital signals and feeding the converted signals to the micro-computer 58. The clock circuit 54 is a circuit for producing signals having various time widths on the basis of a fundamental frequency of 1 MHz that is generated by a crystal oscillator. The counter circuit 55 is a circuit for counting pulse signals of the right pulse pick-up 42 and the left pulse pick-up 43 applied via the signal conditioner 51 within a predetermined time width. The digital switch circuit 56 is a circuit for reading out signals from the car variety number receiver 3a and the inspection type selector device 3b. The switch input circuit 57 is a circuit for reading switch input signals applied from the manual operating device 6. The printer circuit 59 is a circuit responsive to commands from the micro-computer 58 for controlling operations of the recorder device 4. The control output circuit 60 is a circuit responsive to commands from the micro-computer 58 for controlling operation of the display device 5. The core memory control circuit 61 is a circuit for controlling read-out and write-in operations between the micro-computer 58 and the inspection item selector circuit 12, inspection item memory circuit 13, reference value memory circuit 14 and good/bad decision circuit 16. The circuits 52 to 61 can be easily constructed according to known techniques, and therefore, further description will be omitted here.

Figure 9:
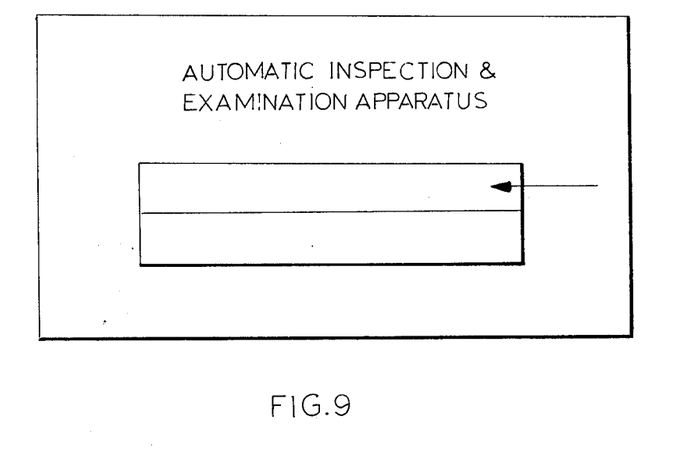
FIGS. 9, 10 and 11 are schematic views showing details of a display device.
Figure 10:
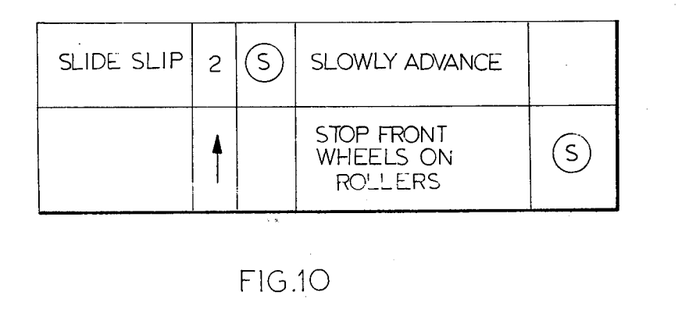
Figure 11:
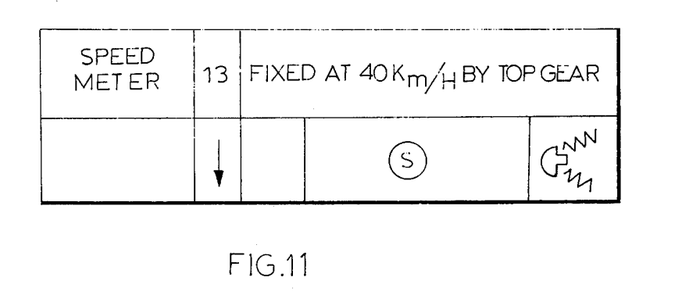

Next, the details of the display device 5 will be explained with reference to FIGS. 9, 10 11. On a display panel illustrated in FIG. 9, a display window portion designated by the arrow changes its display as shown in FIGS. 10 and 11, and thereby can successively inform an inspector of the results of the inspection items. More particularly, at the center of the upper portion of the display window is displayed a stage number of an inspection item, while at the center of the lower portion of the same is displayed an arrow or other indicator indicating whether the intermediate lift in the combination tester 2b is rising or falling. In addition, in the left side portion is displayed an inspection item, and in the right side portion is displayed an outline of the inspection process. Thus the inspector can cause the inspection operations to proceed according to this display.

Figure 12:
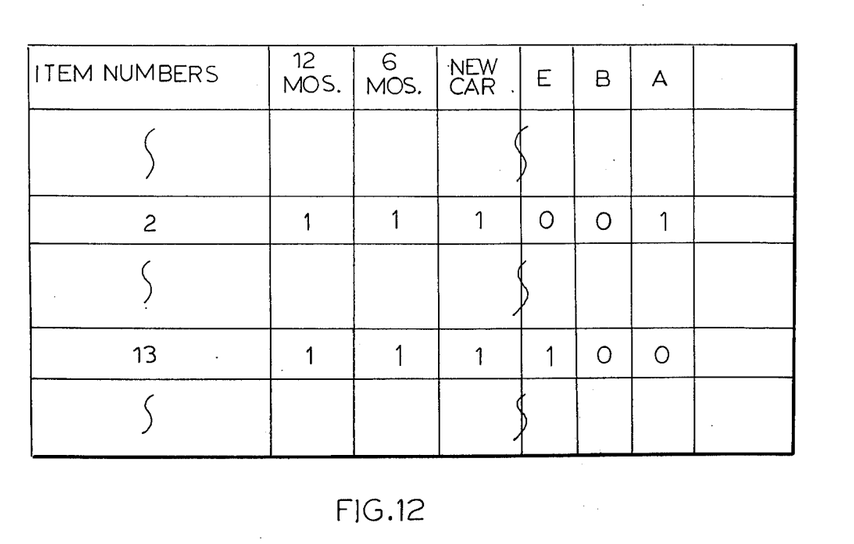
FIGS. 12 is a schematic view showing details of an inspection item memory region.

Now the details of the inspection item memory circuit 13 will be described with reference to FIG. 12. This memory region 13 stores a table as shown in FIG. 12, which indicates whether or not the respective inspection items are necessary for each type of inspection. In FIG. 12, "12 Months" indicates a legally required inspection every 12 months, "6 Months" indicates a legally required inspection every 6 months, and "New Car" indicates an inspection for a new car. In addition, "E" designates an inspection relating to only an engine and its relevant parts, "B" designates an inspection relating to only a brake system and its relevant parts, and "a" designates an inspection relating to only wheel alignment and relevant parts. Numeral "1" designates the necessity of the inspection in question, while numeral "0" designates that the inspection is not necessary. One example of the use of the table is illustrated in FIG. 12 which shows that an inspection for Item No. 2, that is, a side slip test (See FIG. 10) is necessary every 12 months, every 6 months, for new cars, and requires inspection of wheel alignment and relevant parts, and that an inspection for Item No. 13, that is, a speed meter test (See FIG. 11) is necessary every 12 months, every 6 months, and for new cars, and requires inspection of the engine and its relevant parts. Accordingly, the microcomputer 58 can successively supply inspection items to an inspector corresponding to the type of inspection entered into the inspection item selector circuit 12 and to the inspection items for such type of inspection stored in the memory circuit 13.

Figure 13:
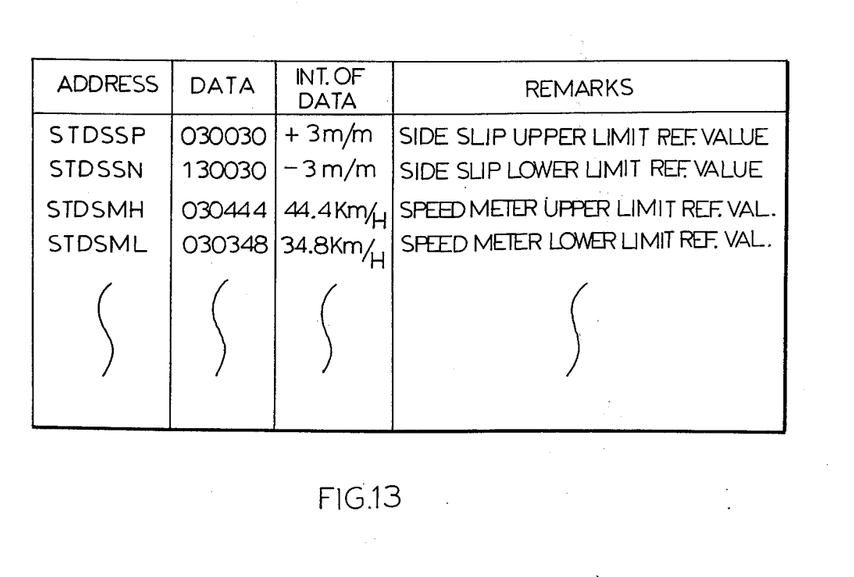
FIG. 13 is a schematic view showing details of a reference value memory region.

The details of the reference value memory circuit 14 are illustrated in FIG. 13. The reference values are classified into two classes, in one of which the reference values are according to the legally regulated reference for safety maintenance of motor cars or the like as shown in FIG. 13, and in the other class in which the reference values depend upon the car variety number received by the car variety number receiver 3a.

Figure 14:
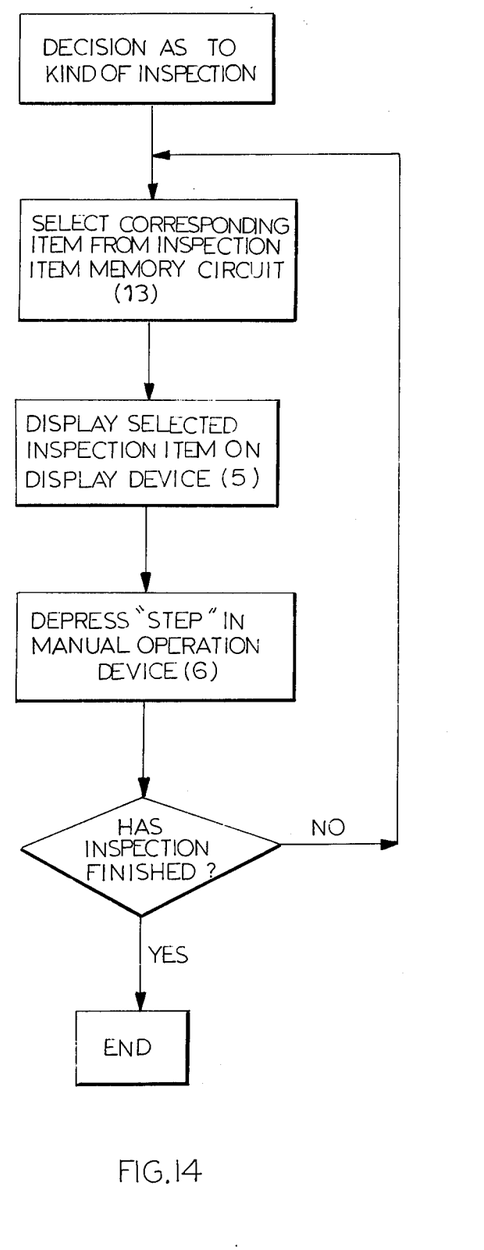
FIG. 14 is a flow chart showing details of a program in an inspection item selector circuit.

Next, the details of the operation of the inspection item selector circuit 12 will be described with reference to the flow chart in FIG. 14. Once the type of inspection is determined, the necessary inspection items are successively selected from the inspection item memory circuit 13 and supplied to an inspector as displayed on the display device 5.

Figure 15:
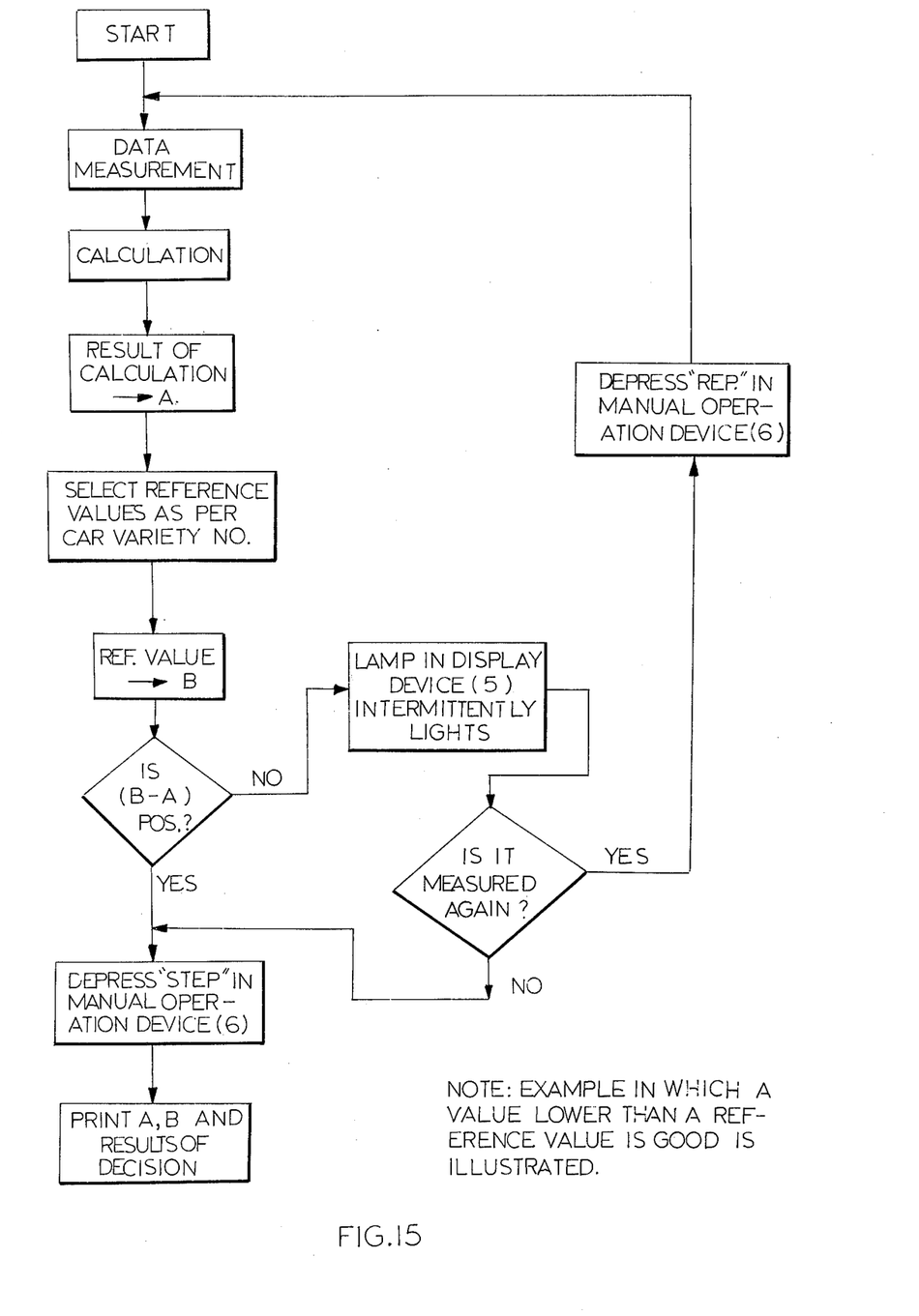
FIG. 15 is a flow chart showing details of a program in a good/bad decision circuit.

Now the details of the good/bad decision circuit 16 will be described with reference to the flow chart in FIG. 15. The measured data and the reference values are momentarily compared to determine whether the results of comparison are good or bad, and the results are supplied to an inspector. Furthermore, in case the results are bad, provision can be made for performance of simple adjustments and repairs at the necessary place and then measurement can be conducted again.

When a motor car 1 to be inspected has appeared, the kind of inspection and adjustment required for this motor car is selected by an appropriate push-button switch of the inspection type selector device 3b, then the corresponding car variety number is prepared on the basis of the type and various factors of the motor car to be inspected with reference to an index table for car variety numbers, and then this car variety number is transferred to and represented by the dial plates 23 by rotating the discs 22 of the car variety number receiver device 3a. By the above-described processing, the type of inspection and the car variety number are supplied to the input of the central control device. Then, the inspection item selector circuit 12 receives signals representing said type of inspection and car variety number from the central control device 11, and in response thereto it successively selects the inspection items corresponding to the type and various factors of that motor car and corresponding to the type of inspection, from the inspection item memory circuit 13, and displays the inspection items in order on the display device 5 to inform an inspector. When use of the measurement instruments 2a - 2e is necessary for the necessary inspection item, the manual operating device 6 is operated. Then, in response to commands from the manual operating device 6 or commands from the central control device 11 responsive to the operation of the manual operating device 6, the appropriate measurement instruments 2a-2e are actuated, and measurement to carry out the desired inspection item is carried out for the motor car 1 to be inspected.

The measured values are subjected to signal conversion in the measurement circuit 15, and the converted signals are applied to the input of the good/bad decision circuit 16 via the central control device 11. In the good/bad decision circuit 16, the measured values are compared with reference values corresponding to the inspection items which have been selected from the reference value memory circuit 14, and thereby it is decided whether the result of the inspection is good or bad. The result is recorded by the recorder device 4. Of course, among the inspection items are included items relating to a visual inspection or a manual inspection, and when these items are displayed on the display device 5, after the visual inspection or manual inspection has been performed the inspector decides whether the result of inspection is good or bad, and applies the result of this decision to an input of the central control device 11 by actuating a push-button switch of the manual operating device 6 so the results are recorded by the recorder device 4.

In order to facilitate understanding of the above-described operations, outlines of the inspection and examination after a car variety number and a type of inspection have been applied to the input of the central control device 11 and an inspection item has been displayed on the display device 5, will be described, by way of examples, for a side slip test as illustrated in FIG. 10 and for checking the accuracy of a speed meter as illustrated in FIG. 11.

At first, for a side slip test, when a display of "side slip test" has been placed on the display device 5 as shown in FIG. 10, a motor car 1 to be inspected is stopped just before the side slip tester 2a, and then the SET push-button of the manual operating device 6 is depressed. Subsequently, the front wheels of the motor car 1 to be inspected are advanced slowly and straight forwards on the side slip tester 2a, and the front wheels are stopped on the rollers of the combination tester 2b. Then the SET push-button of the manual operating device 6 is depressed to terminate this inspection.

Now a description will be given of the circuit operations in the above inspection. The output voltage of the side slip potentiometer 44 is obtained which is proportional to the amount of displacement due to the side slip. In response to the first depression of the SET push-button, a side slip maximum value circuit and a side slip minimum value circuit in the signal conditioner 51 are set by the micro-computer 58 and the engine analyzer circuit 52. Subsequently, the maximum value and minimum value of the measured data during the period when the motor car 1 advances slowly on the table of the side slip tester 2a, are fed by said maximum value circuit and said minimum value circuit, respectively, into the signal conditioner 51. In response to the second depression of the SET push-botton, the maximum and minimum values of the measured data which have been retained previously in the signal conditioner 51 are converted into digital signals by the A/D converter circuit 53 and sent to the micro-computer 58. On the other hand, reference values (in this case, +3.0 m/m −3.0 m/m) stored in the reference value memory circuit 14 and up-to-date measured data are compared by the good/bad decision circuit 16, and the measured values, reference values and results of the decision are respectively printed out by the recorder device 4 via the printer circuit 59.

For checking the precision of a speed meter as illustrated in FIG. 11, when a display of "speed meter test" has been provided on the display device 5 as shown in FIG. 11, the driven wheels of a motor car 1 to be inspected are placed on the rollers of the combination tester 2b, and the driven wheels are accelerated until the speed meter on the motor car indicates "40 Km/H" in high top gear. When the speed has become stable, the SET push-button of the manual operating device 6 is depressed. When the data has been taken, a buzzer sounds automatically to inform the inspector that inspection for this item has been completed.

Now a description will be given of the circuit operations in the above inspection. Among the pulses emitted from the right pulse pick-up 42 and the left pulse pick-up 43, the number of those coming in the time period of 160 ms defined by the clock circuit 54 are counted by the counter circuit 55 via the signal conditioner 51. In addition, the peripheral speed of the roller is calculated from an average value of the right and left data. Further, reference values (in this case, 34.8 Km/H ~ 44.4 Km/H) and up-to-date data are compared by the good/bad decision circuit 16, and the measured value, reference values and results of the decision are respectively printed out by the recorder device 4 via the printer circuit 59.

The illustrated apparatus is provided with many safety means and many switching means for operations. For example, by actuating the push-buttons of the manual operating device 6, the apparatus can achieve the following functions:

1 During a brake test, the driving motor of the combination tester 2b is inhibited from starting.

2 When any failure to achieve a measurement occurs, it is possible to repeat the measurement.

3 Automatic operation or manual operation of a measurement instrument can be selected by switching.

4 The state of the inspection for the desired, i.e. whether the item inspection is not completed or whether the inspection and recording have been completed can be confirmed by display lamps on the display device 5.

4 confirmation lamps on the display device 5, the recording of whether the inspection results are good or bad can be confirmed.

Since the inspection and examination apparatus according to the present invention is constructed as described above, it can accomplish inspection and examination of motor cars exactly, easily and quickly.

In adition, since the inspection and examination apparatus according to the present invention is constructed as described above, it is applicable to every kind of inspection and adjustment, and the apparatus itself can be manufactured in a compact and less expensive manner than a complete computer.

Still further, since the inspection and examination apparatus according to the present invention is constructed as described above, it can automatically display necessary inspection and examination items for an inspector, in proper order without omission, and also it can automatically determine whether the results of the inspection and examination are good or bad with respect to reference values.

Describing now the comparison between the heretofore practiced inspection and examination and the inspection and examination according to the present invention, where the inspection heretofore required a plurality of inspectors and 2.4 – 2.8 hours, the apparatus according to the present invention can be complete an inspection up to preparation of a record of inspection result with only a single inspector in 35 minutes. In addition, considering the size of a memory needed for data with respect to 1000 kinds of motor cars by way of example, then only about 1/500 of the memory in the heretofore known apparatus is sufficient for the apparatus according to the present invention. Furthermore, upon the appearance of a new type of car, it is possible to immediately carry out the inspection and examination simply by determining the car variety numer on the basis of the car catalog or the like without additionally storing the various factors of the new type of car into the memory.

Since many changes can be made in the above construction any many apparently widely different embodiment of this invention can be made without departing from the scope thereof, it is intended that all matter contained in the above description or shown in the accompanying drawings shall be interpreted as illustrative and not in a limiting sense.

What is claimed is:

1. An inspection and examination apparatus for motor cars, comprising: car variety number receiver means for receiving a car variety number corresponding to the type and various characteristics of a motor car to be inspected; an inspection type selector means for selecting one of a plurality of types of inspection desired for the motor car to be inspected; an inspection item memory circuit for storing inspection items required for each type of inspection for each car variety number; a central control device to which said car variety number receiver means and said inspection type selector means are connected for supplying to said central control device the car variety number and the type of inspection desired; an inspection item selector circuit connected to said central control device and to said inspection item memory circuit for receiving the car variety number and type of inspection from said central control device and for successively selecting the inspection items corresponding to the car variety number and type of inspection from said inspection item memory circuit and supplying them to said central control device; display means connected to said inspection item selector circuit for displaying the inspection items selected by said inspection item selector circuit; measurement instruments for mesuring the conditions of a motor car corresponding to the inspection items; measurement instrument control means connected between said measuring instruments and said central control device for actuating said measuring instruments for measuring the conditions of a motor car for the selected inspection items and supplying the results of the measurements to said central control device; a reference value memory circuit for storing predetermined reference values for each of said inspection items and connected to said central control device; and a good/bad decision circuit connected to said central control device for receiving reference values corresponding to the selected inspection items and measured values from said measurement instrument control means and comparing them for determining whether the result of the inspection is good or bad.

2. An apparatus as claimed in claim 1 further comprising recorder means connected to said decision circuit for recording the results of a good/bad deicision obtained by the good/bad decision circuit in response to a signal sent from said good/bad decision circuit.

3. An apparatus as claimed in claim 1 further comprising manual operating means connected to said central control device for applying the result of a visual inspection or manual inspection corresponding to a selected inspection item to said central control device for supply to said good/bad decision circuit.

* * * * *